(12) United States Patent
Tannenbaum

(10) Patent No.: US 6,629,074 B1
(45) Date of Patent: *Sep. 30, 2003

(54) RESOURCE UTILIZATION INDICATION AND COMMIT MECHANISM IN A DATA PROCESSING SYSTEM AND METHOD THEREFOR

(75) Inventor: Alan Richard Tannenbaum, Austin, TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 922 days.

(21) Appl. No.: 08/911,596

(22) Filed: Aug. 14, 1997

(51) Int. Cl.⁷ ................................................ G10L 15/00
(52) U.S. Cl. ...................................................... 704/270
(58) Field of Search ............................. 711/159, 100; 704/231, 4; 395/184.01, 180, 183.02; 702/1

(56) References Cited

U.S. PATENT DOCUMENTS

| | | | |
|---|---|---|---|
| 4,779,209 A | 10/1988 | Stapleford et al. | 364/513.5 |
| 4,829,576 A | 5/1989 | Porter | 381/43 |
| 4,914,704 A | 4/1990 | Cole et al. | 381/43 |
| 5,008,941 A | 4/1991 | Sejnoha | 381/43 |
| 5,031,113 A | 7/1991 | Hoellerbauer | 364/513.5 |
| 5,231,670 A | 7/1993 | Goldhor et al. | 381/43 |
| 5,386,494 A | 1/1995 | White | 395/2.84 |
| 5,396,419 A | 3/1995 | Morimoto | 364/419.02 |
| 5,463,775 A * | 10/1995 | DeWitt et al. | 395/184.01 |
| 5,475,798 A | 12/1995 | Handlos | 395/2.86 |
| 5,526,259 A | 6/1996 | Kaji | 364/419.03 |
| 5,528,739 A | 6/1996 | Lucas et al. | 395/145 |
| 5,646,871 A * | 7/1997 | Cadot | 364/579 |

OTHER PUBLICATIONS

Microsoft, "Microsoft MS–DOS User's Guide", 1988, pp. 335,354and 355.*
Microsoft "Microsoft Computer Dictionary" Microsoft Press, p. 69, 1994.*
Voice Type "Voice Type Dictation for Windows UK English" IBM, pp. 1,9,24,54,76,172 and 173, Jan. 1995.*
Schindler, Esther "The computer speech book" Academic Press, pp. 32, 118, 140, 1996.*
Greiner, Lynn "Health care for you PC", Computing Canada, p28, Aug. 1, 1996.*
Microsoft, "Microsoft press computer dictionary" Microsoft press pp. 69,109,227,228, 1994.*
Doyle, Microsoft press computer dictionary, Penguin Books, pp. 109 and 110, 1994.*
Microsoft, Microsoft Windows Users Guide, Microsoft, p. 524, 1992.*
Rabiner et al. Fundamentals of speech recognition, Prentice Hall p. 12, 1993.*

* cited by examiner

*Primary Examiner*—Tālivaldis Ivars Smits
(74) *Attorney, Agent, or Firm*—Barry S. Newberger; Winstead Sechrest & Minick P.C.; Jeffrey S. LaBaw

(57) ABSTRACT

A graphical user interface is implemented to indicate how much of the systems resources are being consumed during a dictation operation, via speech recognition, of a document and its corresponding persistent results information and when said resources are nearing their capacity. An external user may take steps necessary to reduce the information stored within the memory resources of a data processing system implementing this graphical user interface in an efficient and effective manner, through the use of a "commit" signal.

43 Claims, 5 Drawing Sheets

RESOURCE UTILIZATION INDICATION AND COMMIT MECHANISM IN A DATA PROCESSING SYSTEM AND METHOD THEREFOR

TECHNICAL FIELD

The present invention relates in general to a data processing system, and more particularly, to a graphical user interface for indicating utilization of resources within the data processing system, implementing a speech dictation application.

BACKGROUND INFORMATION

With new and exciting advances in technology, speech command and control systems are being deployed in telephone and desktop data processing systems. As such speech command and control systems are developed, the introduction of a speech-to-text, or dictation, system has become feasible. For example, refer to the IBM Voice Type Dictation products and the IBM Simply Speaking products. This dictation system, available from IBM (International Business Machines, Inc.) is primarily used for applications which require short text entry, such as a memo of a few pages, a note for e-mail, or a medical report. As dictation systems become more robust and as dictation capability is added to full-fledged word processing systems, an amount of text entered will grow. Therefore, associated with such increased dictation capability, is the increased utilization of memory required to implement the dictation system within the data processing system.

An important aspect of such dictation systems is a correction mechanism. Speech recognition inherently involves a relatively high error rate, attributable to both the technology and the vocabulary. As text correction is a time-intensive process which requires oversight by an external human user, it is helpful to implement a correction system using a data processing system which allows the user or an associate to be involved during the correction process. To implement such a system, a speech-aware text processor must maintain persistent results information values which are obtained at the time each word is recognized. These results information values include an audio recording of the user as they are speaking that word, as well as alternative words which may be associated with a "best guess" word recognized by a voice dictation system.

Thus, when a user proofreads the dictated text, the user may utilize the results information to efficiently correct the misrecognized words. For example, when the system is notified by the external user that an error occurred during the dictation process, the system may use the results information to play back the user's voice for that word. Additionally, when the system is notified that an error occurred during the dictation process, the results information may be used to present a list of alternatives for the erroneous word, where the list of alternatives was determined by recognition algorithms at the time of recognition. Such recognition algorithms are well-known in the data processing art and, therefore, will not be described in greater detail. It should be noted that when a word is corrected via a selection of a word from the list of alternatives, a crucial learning process of the speech recognition system is implemented. Through the use of this correction process, the system's understanding of the user's speech and usage patterns may be updated. It should be noted that in this context, "usage" refers to the sequences of words that the user employs. A statistical model of n-word sequences (n-grams) is kept to predict spoken words.

The results information required to provide this learning process and an easily usable system can be very costly in terms of system resources. For example, the results information comprise a tag or a handle into a recognition results data base that is maintained by a speech recognition system and is returned to a text system along with the best alternative. This tag is typically thirty-two bits long. Furthermore, the recognition results database that is accessed by the tag includes an audio recording of the user's voice for each word, as well as the alternative guesses for each word. The alternative guesses represent at least a multiple of five or six times the storage space needed for the "best guess" word. Additionally, the audio recording is typically captured at 11 Kbytes per second. The recording capture rate may also be as much as twice that rate, depending on the needed fidelity. Thus, it may be seen that a substantial amount of memory is required for the audio recording, as well as storage space for each of the identified alternative words. One embodiment of the system which stores the audio recording of a voice which is being provided to a speech-to-text, or dictation, system as disclosed in U.S. Pat. No. 5,031,113 by Höllerbauer. Additional information is disclosed in "Multimedia Presentation Techniques and Technologies," International Technical Support Center, IBM, Boca Raton, Fla., 1993, IBM Order No. GG243975, which is hereby incorporated by reference herein.

As the results information consumes such a substantial amount of memory within a data processing system, an amount of results information which may be stored is limited. Typically, where small amounts of text are dictated, the use of such substantial memory is not an issue. However, as voice dictation systems are advancing technologically, a need has arisen for voice dictation systems which will support more substantial documents, especially where said documents are composed in multiple sessions and the results information persists across sessions. In such situations, the capacity of resources within a data processing system may be exceeded if an amount of data stored within the results information value is not minimized.

Therefore, as dictation is used for longer documents, a mechanism is needed to prune the resources consumed by the dictated document and its persistent recognition data, also referred to as persistent results information. Furthermore, a mechanism is needed to involve an end user in the pruning process, since only the user knows when they have completed some text entry, and no longer require information for subsequent correction of the text. Automatic mechanisms, such as least recently used algorithms, are not appropriate for this task.

SUMMARY OF THE INVENTION

The previously mentioned needs are fulfilled with the present invention. Accordingly, there is provided, in a first form, a data processing system. The data processing system includes a central processing unit for detecting an availability of a resource during execution of the data processing application. The availability of the resource is selectively modified in response to execution of the data processing application. The data processing system also includes a display device for providing an indication of the availability of the resource. The indication of the availability is selectively modified in response to execution of the data processing application.

Additionally, there is provided, in a second form, a program storage device readable by a machine, tangibly embodying a program of instructions executable by the machine to perform method steps for executing a data processing application. The method steps include receiving a first plurality of user inputs at an input circuit and translating the first plurality of user inputs to a first plurality of translated data values. The method steps also include storing the first plurality of translated data values in a first portion of a memory having a predetermined storage space and modifying a presentation of an indicator in response to a remaining portion of the predetermined storage space of the memory.

Furthermore, there is provided, in a third form, a data processing system. The data processing system includes an input circuit for receiving a first plurality of data values and commit input control signal. A memory stores the first plurality of data values in a first portion of the memory. A central processing unit selectively enables the memory to make the first portion of the memory available for storing a second plurality of translated data values in response to a first logic state of the commit input control signal.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
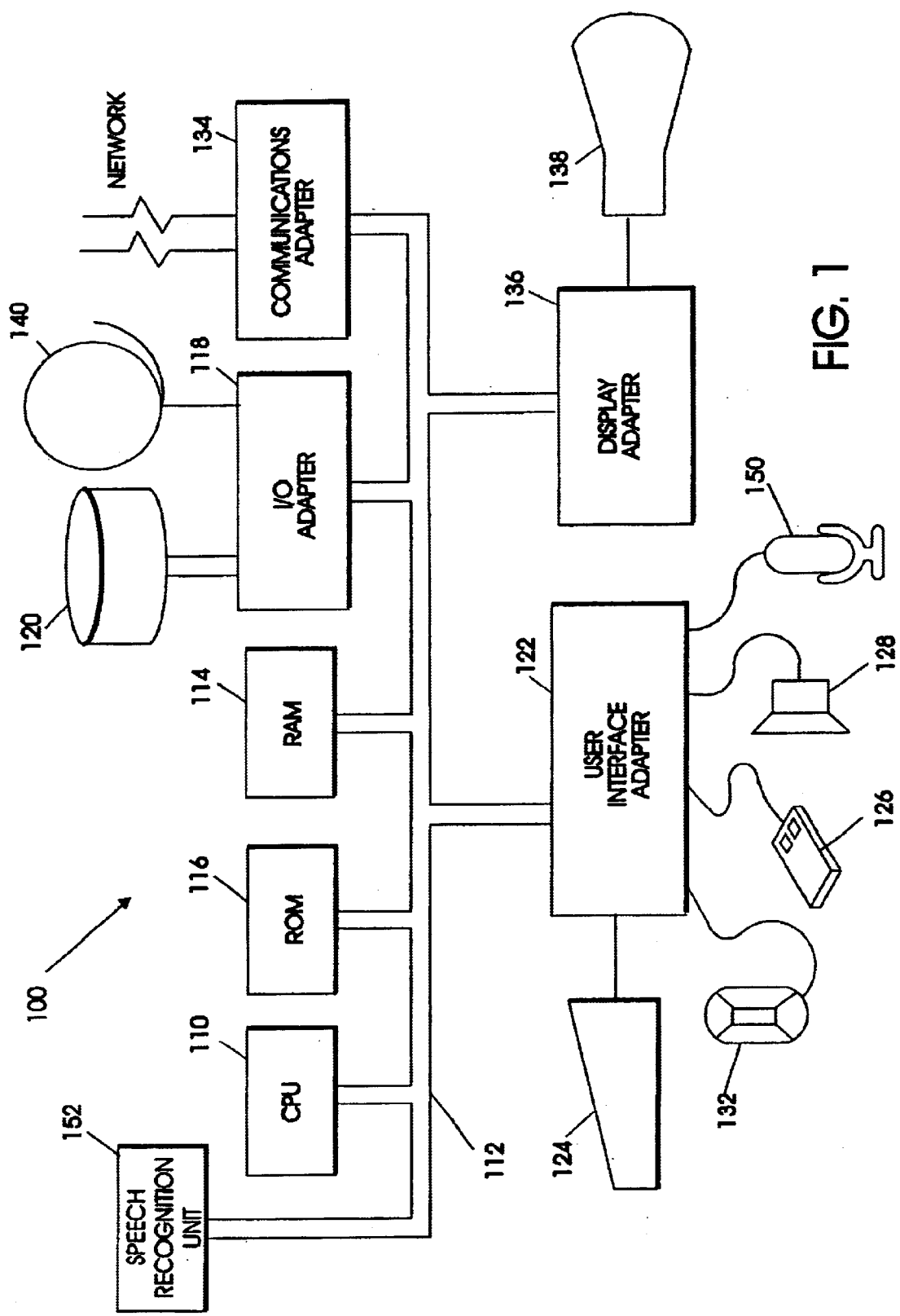
FIG. 1 illustrates, in block diagram form, a data processing system in accordance with one embodiment of the present invention.

The present invention implements a graphical user interface which indicates when resources consumed by a dictated document and the corresponding persistent results information values are nearing their capacity, such that the user may then take steps necessary to reduce the information stored within the memory resources of a data processing system in an efficient and effective manner.

The graphical user interface of the present invention may take several forms. One example is an indicator which illustrates an amount of system resources consumed by a document currently being dictated. This indicator is accompanied by a button or other input mechanism that allows the user to signal the data processing system that the text entered thus far has been reviewed and corrected, and the resources used may be freed. Additionally, in an alternate embodiment of the present invention, the button or input mechanism, itself, may gradually change colors or shades, to indicate resource utilization. Furthermore, a threshold may be set in another embodiment of the present invention. After that threshold value is reached, a significant change in the graphical user interface will occur. This significant change may be a visible indication (e.g., blinking, color change) or an audible indication (e.g., periodic sound). When this input mechanism is accessed, system resources will then be released and an appearance of the button will be reset. Additionally, when system resources are not at capacity levels the present invention continues to allow the text to be changed, but without the assistance of the recognition information.

While the foregoing has provided a brief explanation of the present invention, a data processing system and method for operation thereof will subsequently be described in greater detail.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110. The CPU 110 is coupled to various other components by system bus 112. Speech recognition unit 152 is coupled to various other components of data processing system 100 by system bus 112. Additionally, it should be noted that speech recognition unit 152 may be implemented as software which resides in RAM 114, ROM 116, disk storage device 120, or storage device 140. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128, and microphone 150 are all interconnected to bus 112 via user interface adapter 122. Display monitor 138 is connected to system bus 112 by display adapter 136. In this manner, a user is capable of inputting to the system through keyboard 124, trackball 132, mouse 126, and microphone 150 and receiving output from the system via speakers 128 and display device 138. Additionally, an operating system is used to coordinate the functions of the various components shown in FIG. 1. It should be noted that the operating system may be OS/2 ("OS/2" is a trademark of the IBM Corporation). During operation of the present invention, the operating system and a voice navigator may be stored in RAM 114, ROM 116, disk storage device 120 or storage device 140. Furthermore, it should be noted that the voice navigator is an application which controls speech communications between an external user and data processing system 100.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory such as disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

During a following description of operation, speech recognition unit 152 will be referred to often. A more detailed description of speech recognition unit 152 will not be provided herein as such units are well-known in the relevant data processing art. For information regarding speech recognition unit 152, refer to U.S. Pat. No. 5,465,317, entitled "Speech Recognition System With Improved Rejection of Words and Sounds Not in the System Vocabulary," by Edward A. Epstein, et al., and issued on Nov. 7, 1995, which is hereby incorporated by reference herein. For additional information, refer to U.S. Pat. No. 5,513,298 entitled "Instantaneous Context Switching for Speech Recognition Systems" by Vince M. Stanford, et al., and issued on Apr. 30, 1996.

Figure 2:
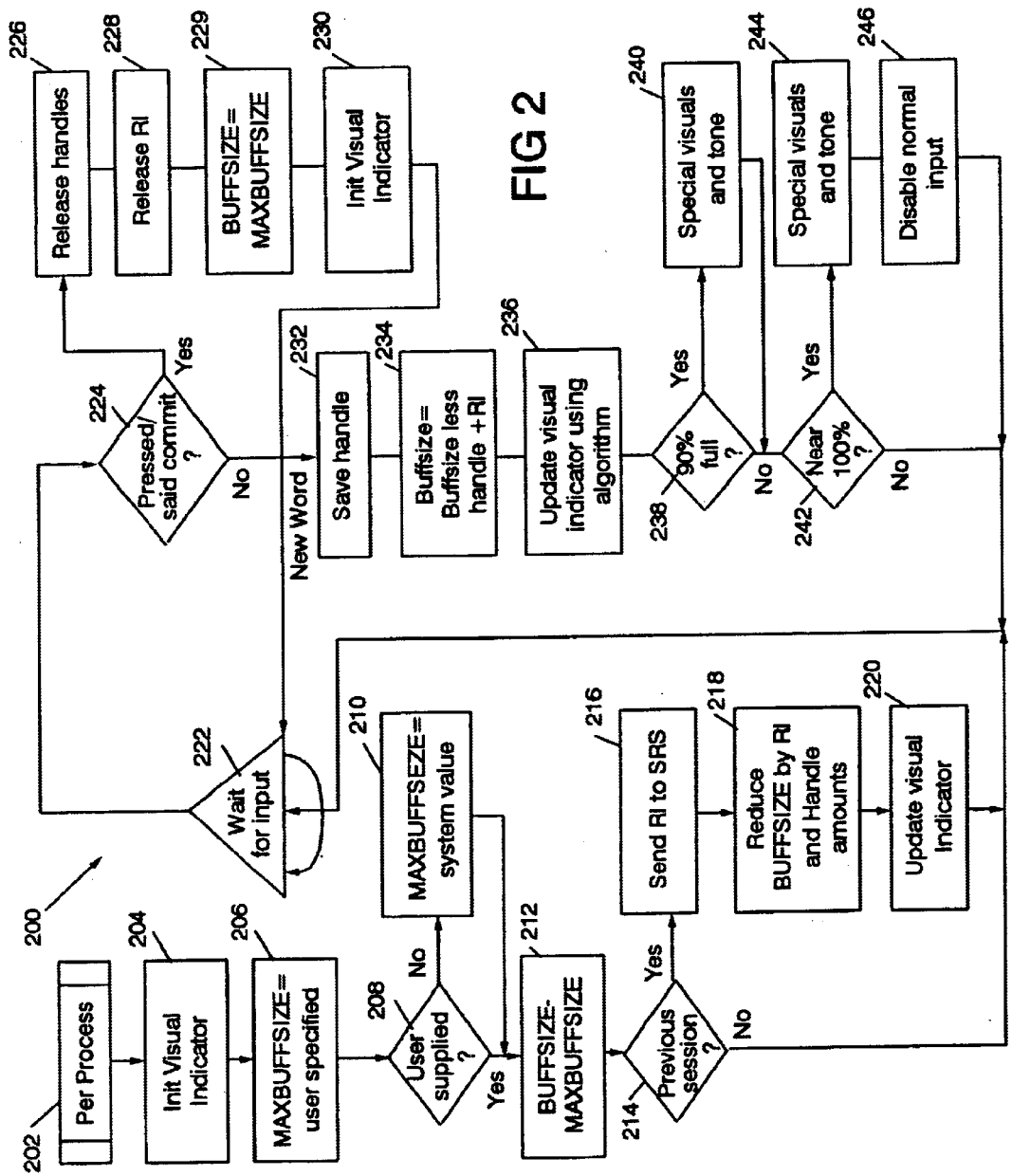
FIG. 2 illustrates, in full diagram form, a methodology for implementing one embodiment of the present invention.

The use of data processing system 100 to execute the operations of the present invention will subsequently be described with reference to FIG. 2. Assume that, in the first stage of operation, data processing system 100 is operating using an operating system such as OS/2 available from IBM Corporation or Windows-95 available from Microsoft. It should also be noted that additional operating systems could also be used to implement the present invention.

During operation of data processing system 100 of the present invention, a graphical user interface is provided to indicate when system resources, such as RAM 114, are nearing their capacity levels. Prior to describing generation of a graphical user interface, the steps of gathering, storing, and retrieving the results information stored within RAM 114, or another memory (illustrated or not illustrated herein) of data processing system 100 will be described. So that an external user speaks a word to be translated to a text document. This speech will typically be provided to microphone 150. As a user speaks each word, speech recognition unit 152 accumulates the results information, which includes a recorded voice of the speaker and alternative recognition candidates corresponding to each word. It should be noted that the results information may also include more or less data, as determined by a system in which data processing system 100 is operating. The results information is accessible by speech recognition unit 152 through the use of a "tag," or an identifier. Therefore, each time speech recognition unit 152 receives a spoken word, identifies the word, and passes that word to an application (e.g., a word processor), an identifier is also returned to the application. The identifier can later be used to reference the associate result information as the application saves this handle with the recognized work. This process continues for every recognized word. Such operation is well-known in the data processing art and, therefore, will not be described in greater detail herein.

If the user asks to correct a misrecognized word which has been displayed within the application, the user merely points to the word using mouse 126 or another user interface. Use of such user interfaces to point to and identify objects displayed on display device 138 is well-known to those with skill in the data processing art and, therefore, will not be described in greater detail herein. Subsequently, when the user points to the word and evokes the correction feature, the application accesses the identifier associated with the recognized word to request the results information from speech recognition unit 152. When the results information is accessed from speech recognition unit 152, the audio information is sent to an audio subsystem of the operating system (not illustrated herein) to be output via user interface adapter 122 and speaker 128. Additionally, the alternative recognition candidates are displayed in a list on display device 138. A method for displaying objects on a display device is well-known to those with skill in the data processing art and, therefore, will not be described in greater detail herein.

When the external user saves the data associated with an application (e.g., the document for a word processor), the results information values are retrieved from the speech recognition unit 152 and are stored with the document. If the document is subsequently re-opened, the previously stored results information are retrieved and made available again to speech recognition unit 152. The identifiers in the document which are associated with each dictated word identify the desired information in the restored results information buffer within speech recognition unit 152.

Furthermore, if the application receives a signal from the user, the application notifies speech recognition unit 152 to release the now-"committed" results information values. When speech recognition unit 152 releases the committed results information values, the application also releases the identifiers that reference the recently released results information values.

With this environment explained in greater detail, a methodology implemented by the present invention will subsequently be described in greater detail. Refer now to FIG. 2. FIG. 2 illustrates a speech commit flow 200 in accordance with one embodiment of the present invention. As step 202 of FIG. 2 illustrates, the methodology implemented by one embodiment of the present invention is performed on a per dictation-enabled application. For example, for each word processor document in progress, this speech commit flow is performed.

In a step 204 of the methodology implemented by one embodiment of the present invention, a visual indicator on a graphical user interface is initialized. This initialization could cause the visual indicator to become a certain color, to be displayed as an empty object (e.g., an empty thermometer), or could be initialized with a certain animation function. The foregoing list not meant to be exhaustive, but merely to provide some examples of manners in which the visual indicator of the graphical user interface may be initialized. It should be noted that displaying objects on display device 138 is well-known to those with skill in the art and, therefore, this process will not be described in greater detail herein. For more information, refer to *Object-Oriented Interface Design, IBM Common User Access Guidelines*, published by Que in December, 1992.

After the visual indicator is initialized, a step 206 is executed. In step 206, a maxbuffsize (maximum buffer size) value is preselected in accordance with an input by an external user. The user provides this input via a profile associated with the application, or some other form of a user interface. The maximum buffer size provided by the user is provided to speech recognition unit 152. In step 208, speech recognition unit 152 determines whether a user supplied the maxbuffsize value. If the user failed to provide a maxbuffsize value, the maxbuffsize value is set to a default system supplied value in a step 210.

Subsequently, a buffer size value (or variable), which indicates an amount of memory space available to store results information during a dictation operation, is set to the maxbuffsize value in a step 212.

In step 214, a determination is made by speech recognition unit 152 as to whether results information from a previous session exists when an application is initiated. If such results information from a previous session exists, then the results information (RI) is sent to speech recognition unit (SRS) 152 in a step 216. The maxbuffsize value is reduced by the retrieved results information values and their associated handles in a step 218. CPU 110 subsequently provides the appropriate control signals to update the visual indicator on the graphical user interface displayed on display device 138 to reflect this initial size in a step 220.

It should be noted that the control signals provided to update the visual indicator are provided in compliance with an algorithm implemented by speech recognition unit 152. This algorithm relates a maxbuffsize percentage to a visual value. For example, should the visual indicator be initialized to be a green value, the green value would gradually change to red in predetermined increments. Such increments could be provided as:

| | |
|---|---|
| 100–90% = | saturated green, |
| 10–0% = | saturated red, |
| 40–60% = | yellow, |
| others = | shades of red and green. |

Next, a step 222 is executed. In step 222, CPU 110 waits for input from speech recognition unit 152 or from another user input. This waiting operation is, in effect, a poling operation and step 222 will continue to loop to itself until a predetermined time period has passed or a desired input is received.

If the user should invoke a user interface which effectively presses a commit control on a graphical user interface displayed on display device 138, that user input is detected by user interface adapter 122. User interface adapter 122 provides the appropriate control signals to CPU 110 to subsequently execute each of steps 226–230. In step 226, CPU 110 enables memory space to be released that was used to store handles within the application. Subsequently, in step 228, CPU 110 enables speech recognition unit 152 to release the results information value. Speech recognition unit 152 releases these values by making memory space available and using a process similar to step 226. After speech recognition unit 152 has released the result information values currently therein and the application has released storage space for handles therein, the buffsize value is reset to the maxbuffsize value in step 229. Additionally, CPU 110 provides control signals to display adapter 136 to update the visual indicator of resource allocation on the graphical user interface display on display device 138 to reflect an initial amount of available resources in a step 230.

Subsequently, user interface adapter 122 waits for the user to speak words to be included within the application. A program flow should then return to step 222. As the user speaks each word and as the handle to the results are received by the application as has been previously described, step 232 is executed. In step 232, the identifier for the word and the results information stored within a memory of data processing system 100 are saved within the application displaying the spoken word in text format. For each word, the buffsize value is reduced by the storage space required for the newly generated results information. As previously mentioned, the results information includes an alternative word list, as well as an audio recording of the user's speech. The visual indicator of the graphical user interface of the present invention is updated to reflect the new buffsize value. Thus, CPU 110 provides the appropriate control signals to display adapter 136 to modify the view of that indicator displayed on display device 138 in a step 236. Stated another way, as the buffsize value gets smaller, less resources are available and the indicator reflects this to the user via the graphical user interface.

When the buffsize value reaches a preselected threshold (10% in one embodiment of the present invention) of the maxbuffsize value, CPU 110 provides control signals to enable display adapter 136 to provide a unique presentation of the visual indicator. For example, display adapter 136 may provide control to flash the visual indicator on display device 138. In the alternative, CPU 110 may provide control signals to user interface adapter 122 to enable an audio tone or voice to be output via speaker 128. Again, it should be emphasized that the threshold of 10% illustrated within FIG. 2 is provided for example only. That threshold value is adjustable in accordance with the desires of the external user.

Subsequently, in step 242, when the buffsize value reaches an emergency threshold (near 0), special visual indications or audio tones, or both, are provided in a step 244. The steps taken to provide these signals have previously been described and, therefore, will not be described in detail herein with respect to this step. Additionally, when the buffsize value reaches an emergency threshold value, CPU 110 stops the dictation mode of operation and disables user interface adapter 122 from receiving any new input until resources are released by the user. It should be noted that the emergency threshold value is not zero so that the user may subsequently perform a small amount of correction and insertion operation. A program flow subsequently returns to step 222.

Figure 3:
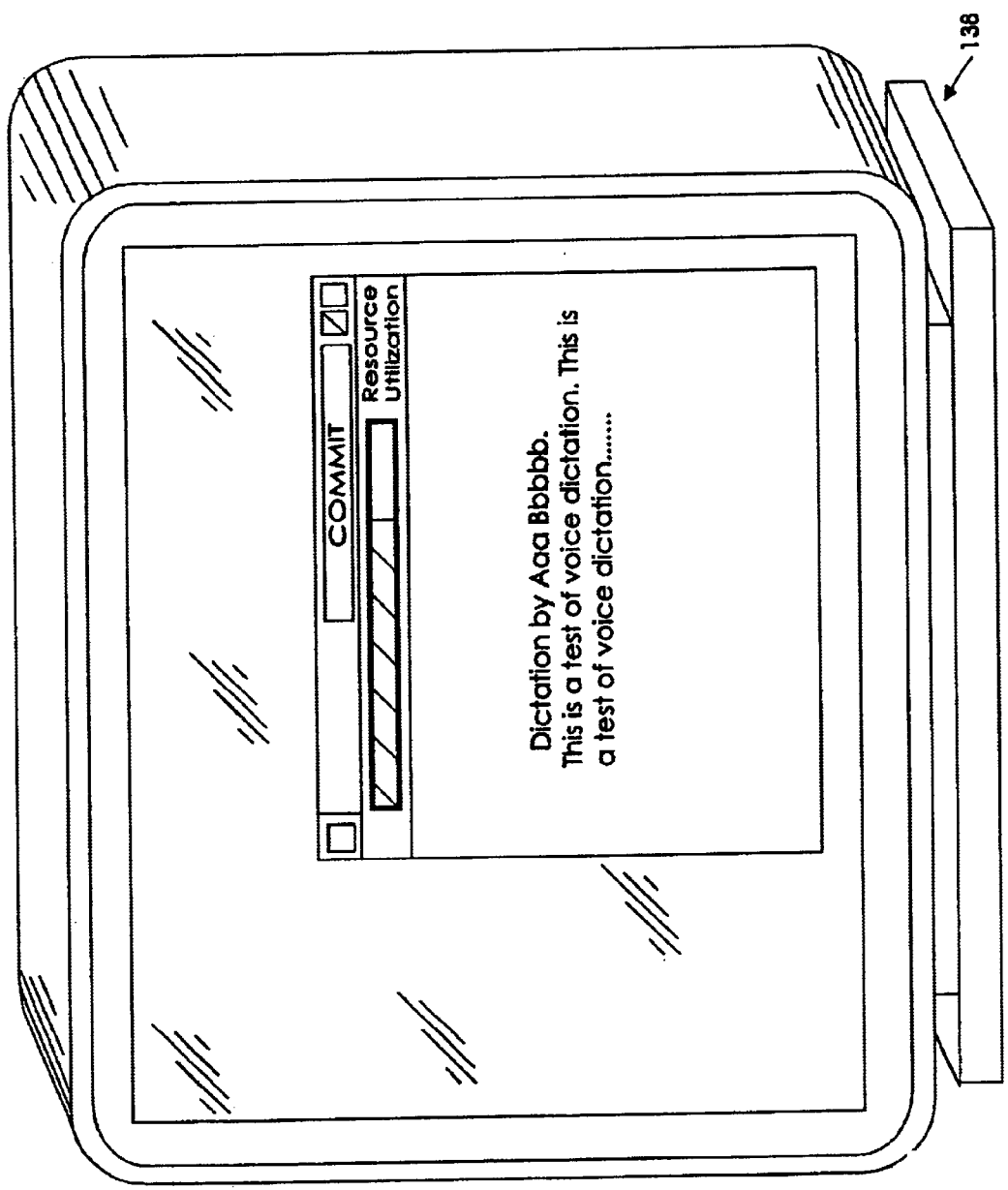
FIG. 3 illustrates, in block diagram form, a display device in accordance with one embodiment of the present invention.
Figure 4:
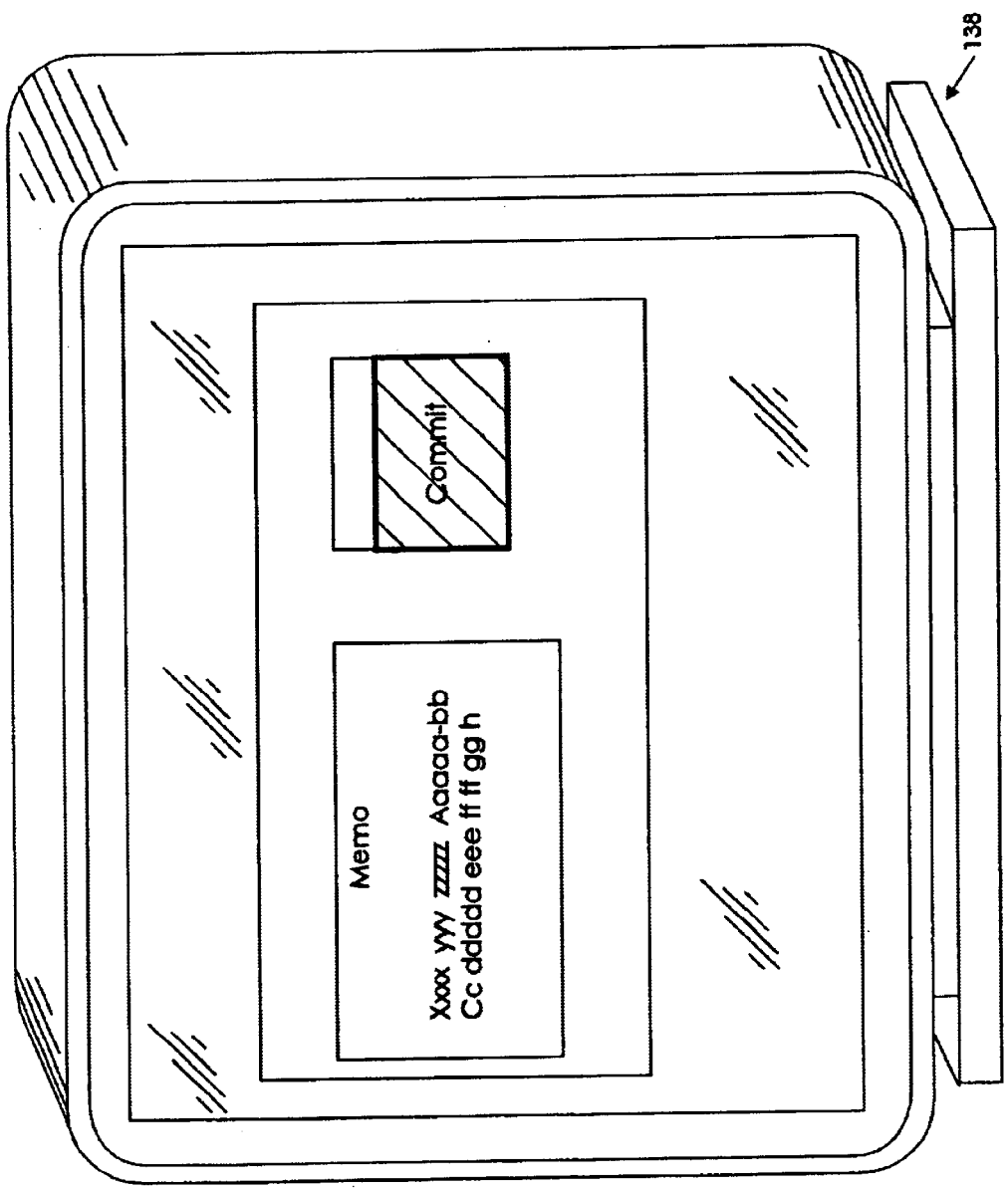
FIG. 4 illustrates, in block diagram form, a display device in accordance with one embodiment of the present invention.
Figure 5:
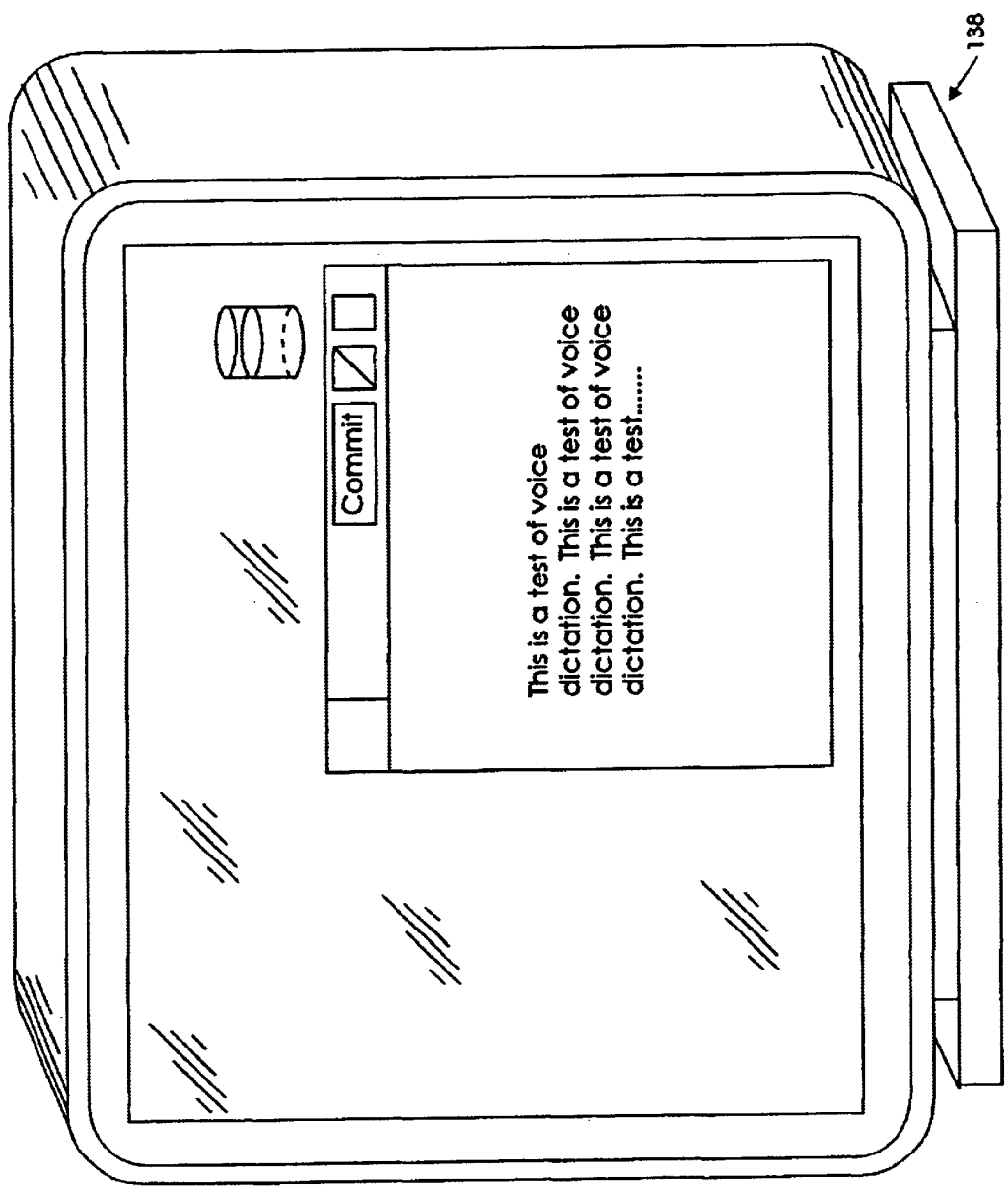
FIG. 5 illustrates, in block diagram form, a display device in accordance with one embodiment to the present invention.

FIGS. 3, 4, and 5 provide some examples of the visual indicator which may be implemented by the present invention. However, it should be known that alternate visual indicators may be implemented as desired by a user.

The foregoing discussion has described one embodiment of the present invention. It should be noted that many additional embodiments also exist.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A data processing system, comprising:
   a central processing unit for detecting an availability of a resource operable for storing data values during execution of an application, said availability of the resource being able to be selectively modified in response to execution of the data processing application, said execution including translating a first plurality of user input signals to a first plurality of translated data values; and
   a display device for displaying said availability of the resource, wherein an indication of availability is selectively modified in response to storing said translated data values in said resource, and wherein the indication is operable for changing from a first state to a second state in response to a preselected threshold.

2. The data processing system of claim 1, wherein the resource further comprises:
   a memory coupled to the central processing unit for storing a first plurality of data values in response to execution of the application.

3. The data processing system of claim 2, wherein the availability of the resource indicates a portion of the memory which is capable of storing a second plurality of data values in response to execution of the application.

4. The data processing system of claim 2 wherein the indication indicates the memory is unable to store an additional data value.

5. The data processing system of claim 1 wherein the application is a speech dictation application.

6. The data processing system of claim 5, further comprising:
   input means for receiving a plurality of user inputs; and
   a speech recognition unit coupled to the input means and coupled to the central processing unit, the speech recognition unit transcribing at least a portion of the plurality of user inputs to generate a plurality of transcribed values in a text format.

7. The data processing system of claim 6, further comprising:
   a memory for storing at least a portion of the plurality of transcribed values, the memory being coupled to the speech recognition unit for receiving the plurality of transcribed values.

8. The data processing system of claim 7 wherein the memory is the resource.

9. The data processing system of claim 8 wherein the indication indicates an amount of storage space available in the memory for storing an additional plurality of transcribed values.

10. The data processing system of claim 7 wherein the memory stores at least a portion of the plurality of user inputs.

11. The data processing system of claim 1 wherein the indication is a visual indicator.

12. The data processing system of claim 1 wherein the indication is an audio indicator.

13. The data processing system of claim 1 wherein said second state includes a prompt indicating said threshold has been crossed.

14. The data processing system of claim 1 wherein said first state corresponds to a first color and said second state corresponds to a second color.

15. The data processing system of claim 1 wherein said second state includes an audio signal.

16. The data processing system of claim 1 wherein said second state includes a control operable for making a portion of said resource available to said application.

17. A data processing system, comprising:
   a central processing unit for detecting an availability of a resource operable for storing data values during execution of an application, wherein the availability of the resource is selectively modified in response to execution of the data processing application, said execution including translating a plurality of user input signals to a plurality of translated data values; and
   a display device for providing an indication of the availability of the resource, wherein the indication of the availability is selectively modified in response to storing said plurality of said translated data values in a first portion of said resource, wherein the resource further comprises:
      a memory coupled to the central processing unit for storing a plurality of translated data values in response to execution of the application, wherein the indication indicates that the memory stores a first plurality of translated data values, wherein the first plurality of data values equals or exceeds a threshold amount of data.

18. A program storage device readable by a machine, tangibly embodying a program of instructions executable by the machine to perform methods steps for executing a data processing application, said method steps comprising:
   receiving a first plurality of user input signals at an input circuit;
   translating the first plurality of user input signals to a first plurality of translated data values;
   storing the first plurality of translated data values in a first portion of the memory having a predetermined storage space; and
   modifying a presentation of an indicator in response to a remaining portion of the predetermined storage space of the memory.

19. The method of claim 18, further comprising the step of:
   initializing the indicator to be displayed on a display device prior to performing the data processing application.

20. The method of claim 18, wherein a step of modifying the presentation of the indicator, further comprises the step of:
   modifying a visual appearance of the indicator on the display device in response to the remaining portion of the predetermined storage space of the memory.

21. The method of claim 18, wherein a step of modifying the presentation of the indicator, further comprises the step of:
   modifying an audio presentation of the indicator on the display device in response to the remaining portion of the predetermined storage space of the memory.

22. The method of claim 18, further comprising the steps of:

receiving a commit input at the input circuit; and enabling the memory to make the first portion of the memory available for storing a second plurality of translated data values.

23. The method of claim 22, further comprising the step of:

reinitializing the presentation of the indicator to indicate additional storage space is available in the memory.

24. The method of claim 18, wherein the data processing application is a speech dictation application.

25. The method of claim 24, further comprising the steps of:

transcribing at least a portion of the first plurality of user inputs to generate a first plurality of transcribed values in a text format; and storing the first plurality of transcribed data values in the first portion of the memory having the predetermined storage space.

26. The method of claim 18, comprising the steps of:

detecting when the remaining portion of the predetermined storage space of the memory has reached a threshold level; and disabling the input circuit from receiving an additional user input.

27. The method of claim 26 further comprising the step of:

selectively receiving a threshold data value at the input means wherein the threshold level is set to the received data value.

28. The method of claim 27, further comprising the step of:

setting the threshold level to a preselected default value when the threshold data value is not provided to the input means.

29. A data processing system, comprising:

an input circuit for receiving a first plurality of data values and a commit input control signal;

a memory for storing the first plurality of data values in a first portion of the memory; and a central processing unit for selectively enabling the memory to make the first portion of the memory available for storing a second plurality of translated data values in response to a first logic state of the commit input control signal.

30. The data processing system of claim 29, further comprising:

a display device for displaying a commit graphical user interface, wherein the commit input control signal is selectively asserted in response to access of the commit graphical user interface.

31. The data processing system of claim 29, further comprising:

a speech recognition unit coupled to the input circuit and coupled to the central processing unit, the speech recognition unit transcribing at least a portion of the first plurality of data values to generate a plurality of transcribed values in a text format.

32. The data processing system of claim 31, wherein the plurality of transcribed values in the text format are stored in the memory.

33. The data processing system of claim 31, wherein the plurality of transcribed values in the text format stored in the memory may be selectively overwritten with the second plurality of translated data values when the commit input control signal is in the first logic state.

34. A program storage device readable by a machine, tangibly embodying a program of instructions executable by the machine to perform method steps for developing a communication interface for a data processing system, comprising the steps of:

detecting an availability of a resource operable for storing data values during the execution of an application, said availability of the resource being able to be selectively modified in response to execution of the data processing application, said execution including translating a first plurality of user input signals to a first plurality of translated data values; and displaying a said availability of the resource, wherein an indication of availability was selectively modified in response to storing said plurality of translated data values in a first portion of said resource, and wherein the indication is operable for changing from a first state to second state in response to a preselected threshold.

35. The storage device of claim 34 wherein said second state includes a prompt indicating said second threshold has been crossed.

36. The storage device of claim 34 wherein said second state includes an audio signal.

37. The storage device of claim 34 wherein said second state includes a control operable for releasing a portion of said resource to said application.

38. The storage device of claim 37 wherein the availability of the resource indicates a portion of the memory which is available for storing a second plurality of data values in response to execution of the data processing application.

39. The storage device of claim 38 wherein said method steps further comprise:

receiving a plurality of user inputs; and transcribing at least a portion of the plurality of user inputs to generate a plurality of transcribed values in a text format.

40. The storage device of claim 38 wherein said method steps further comprises storing at least a portion of the plurality of transcribed values in a memory, the memory being coupled to a speech recognition unit for receiving the plurality of transcribed values.

41. The storage device of claim 38 wherein the indication indicates an amount of storage space available in the memory for storing an additional plurality of transcribed values.

42. The storage device of claim 34 wherein the resource further comprises:

a memory coupled to a central processing unit for storing a first plurality of data values in response to execution of the application.

43. The storage device of claim 34 wherein said application is a speech dictation application.

* * * * *